US010170080B2

(12) United States Patent
Kim et al.

(10) Patent No.: US 10,170,080 B2
(45) Date of Patent: Jan. 1, 2019

(54) ELECTRONIC DEVICE HAVING ANCILLARY DISPLAY WITH COLOR CONTROL

(71) Applicant: Apple Inc., Cupertino, CA (US)

(72) Inventors: ByoungSuk Kim, Seoul (KR); Jun Qi, Cupertino, CA (US); Ali T. Ozer, Cupertino, CA (US); Bongsun Lee, Cupertino, CA (US); Kevin J. Van Vechten, Montecito, CA (US); Patrick O. Heynen, Redwood City, CA (US); John O. Louch, Santa Barbara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/479,477

(22) Filed: Apr. 5, 2017

(65) Prior Publication Data

US 2018/0068636 A1 Mar. 8, 2018

Related U.S. Application Data

(60) Provisional application No. 62/383,898, filed on Sep. 6, 2016.

(51) Int. Cl.
*G09G 5/04* (2006.01)
*G09G 5/14* (2006.01)
(Continued)

(52) U.S. Cl.
CPC ............. *G09G 5/04* (2013.01); *G06F 1/165* (2013.01); *G06F 1/1618* (2013.01); *G06F 3/0202* (2013.01); *G06F 3/0227* (2013.01); *G06F 3/041* (2013.01); *G09G 5/006* (2013.01); *G09G 5/14* (2013.01); *H01H 13/83* (2013.01); *G09G 2320/0666* (2013.01); *G09G 2354/00* (2013.01); *G09G 2360/144* (2013.01); *H05B 33/0872* (2013.01); *H05B 37/0218* (2013.01)

(58) Field of Classification Search
CPC ............ G09G 5/04; G09G 5/14; G09G 5/006; G09G 2354/00; G09G 2320/0666; G09G 2360/144; G06F 1/1618; G06F 1/165; G06F 3/0202; G06F 3/04817; G06F 3/041; H01H 13/83; H05B 37/0218; H05B 33/0872
See application file for complete search history.

(56) References Cited

U.S. PATENT DOCUMENTS 8,441,499 B2 5/2013 Heynen et al.
8,468,465 B2 6/2013 Warner et al.
(Continued)

*Primary Examiner* — Christopher E Leiby
(74) *Attorney, Agent, or Firm* — Treyz Law Group, P.C.; G. Victor Treyz; David K. Cole

(57) ABSTRACT

An electronic device may have a main display and an ancillary display. The device may also have a backlit keyboard with glyphs. An ambient light sensor may measure ambient light levels. Control circuitry in the laptop computer may adjust the color cast of content on the ancillary display depending on whether the content contains glyphs or other input display content or whether the content contains images, color gradients, or other output display content. Input display content may be matched in color cast to the color cast of the glyphs, which may be determined based on backlight status and/or measured ambient light information. Output content may be color matched to the main display.

19 Claims, 5 Drawing Sheets

(51) Int. Cl.
*G06F 1/16* (2006.01)
*G09G 5/00* (2006.01)
*G06F 3/02* (2006.01)
*H01H 13/83* (2006.01)
*G06F 3/041* (2006.01)
H05B 33/08 (2006.01)
H05B 37/02 (2006.01)

(56) References Cited

U.S. PATENT DOCUMENTS

| | | |
|---|---|---|
| 8,730,218 B2 | 5/2014 | Wilson |
| 8,860,653 B2 | 10/2014 | Mahowald et al. |
| 2004/0108968 A1* | 6/2004 | Finke-Anlauff ...... G06F 1/1616 345/1.1 |
| 2004/0135790 A1 | 7/2004 | Moore |
| 2008/0297456 A1* | 12/2008 | Marcu .................. G09G 3/2003 345/88 |
| 2013/0093656 A1 | 4/2013 | Wang |
| 2013/0227448 A1 | 8/2013 | Heynen et al. |
| 2014/0028565 A1* | 1/2014 | Gueorguiev .......... G06F 1/1662 345/168 |
| 2016/0239197 A1* | 8/2016 | Strong .................. G06T 11/001 |
| 2016/0365021 A1 | 12/2016 | Hancock et al. |

\* cited by examiner

ELECTRONIC DEVICE HAVING ANCILLARY DISPLAY WITH COLOR CONTROL

This application claims the benefit of provisional patent application No. 62/383,898, filed Sep. 6, 2016, which is hereby incorporated by reference herein in its entirety.

FIELD

This relates generally to electronic devices and, more particularly, to electronic devices with displays.

BACKGROUND

Electronic devices often include displays. For example, a laptop computer may have a color display for displaying images for a user. Laptop computers may also have keyboard keys and other input-output devices.

During operation, the intensity and color of ambient lighting may change. If care is not taken, ambient light changes and changes in the operating settings of components in the laptop computer may cause the appearance of keyboard keys, displays, and other input-output devices to vary in ways that are not aesthetically appealing.

SUMMARY

An electronic device such as a laptop computer may have a main display on which images are displayed for a user. The main display may be mounted in a display housing. A keyboard and an ancillary display may be mounted in a base housing that is rotatably coupled to the display housing. The keyboard may have backlight keyboard keys with glyphs. The ancillary display may be a touch sensitive display such as a touch sensitive organic light-emitting diode display that is used to display dynamically reconfigurable icons and other content.

An ambient light sensor may make measurements of ambient light intensity and/or color. Control circuitry in the laptop computer may adjust the color cast of content on the ancillary display depending on whether the content contains glyphs or other input display content or whether the content contains images, color gradients, or other output display content. Input display content may be matched to the color cast of the glyphs, which may be determined based on backlight status and/or measured ambient light information. Output content may be color matched to the main display.

DETAILED DESCRIPTION

Electronic devices such as cellular telephones, laptop computers, tablet computers, electronic devices in embedded systems such as systems in homes and vehicles or other embedded system equipment, and other devices may have input-output devices for gathering input and providing a user with output. The input-output devices may include displays, touch screen displays, keyboards, and other input-output components.

Aspects of the appearance of input-output components such as these may be adjusted during device operation to ensure that an electronic devices is aesthetically appealing to a user. For example, the color cast of one or more displays and/or portions of the content on the displays may be adjusted depending on changes in ambient lighting conditions and other variables.

Figure 1:
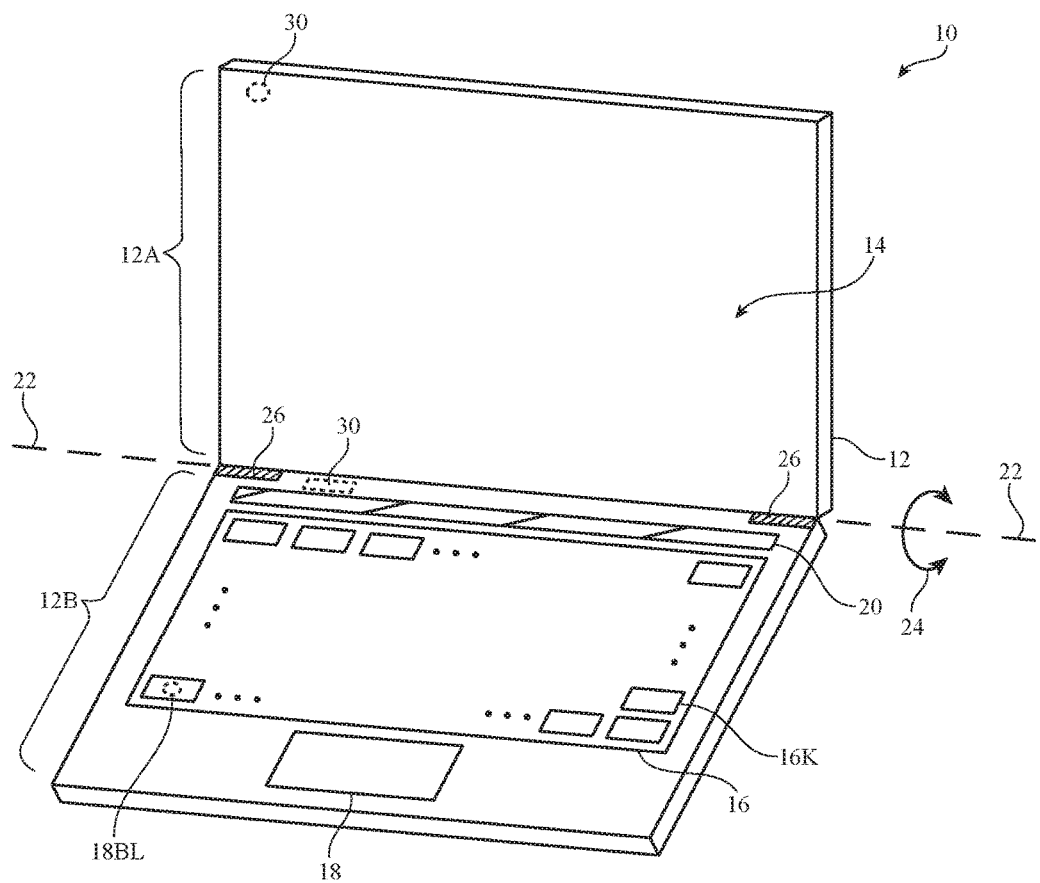
FIG. 1 is a perspective view of an illustrative electronic device such as a laptop computer in accordance with an embodiment.

An illustrative electronic device in which the color cast of displayed content can be adjusted is shown in FIG. 1. Device 10 of FIG. 1 is a laptop computer. If desired, device 10 may be a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a display, a computer display that contains an embedded computer, a computer display that does not contain an embedded computer, a gaming device, a navigation device, an embedded system such as a system in which electronic equipment with a display is mounted in a kiosk or automobile, or other electronic equipment. The laptop computer of FIG. 1 is merely illustrative.

As shown in the example of FIG. 1, device 10 may have a housing such as housing 12. Housing 12 may be formed from plastic, metal (e.g., aluminum), fiber composites such as carbon fiber, glass, ceramic, other materials, and combinations of these materials. Housing 12 or parts of housing 12 may be formed using a unibody construction in which housing structures are formed from an integrated piece of material. Multipart housing constructions may also be used in which housing 12 or parts of housing 12 are formed from frame structures, housing walls, and other components that are attached to each other using fasteners, adhesive, and other attachment mechanisms.

Device 10 may have a one-piece housing or a multi-piece housing. As shown in FIG. 1, for example, electronic device 10 may be a device such as a portable computer or other device that has a two-part housing formed from an upper housing portion such as upper housing 12A and lower housing portion such as lower housing 12B. Upper housing 12A may include a display such as display 14 and may sometimes be referred to as a display housing or lid. Lower housing 12B may sometimes be referred to as a base housing or main housing.

Housings 12A and 12B may be rotatably coupled to each other using hinges 26 along the upper edge of lower housing 12B and the lower edge of upper housing 12A. Hinges 26 may be located at opposing left and right sides of housing 12 along hinge axis 22. Hinges 26 may allow upper housing 12A to rotate about axis 22 in directions 24 relative to lower housing 12B. The plane of lid (upper housing) 12A and the plane of lower housing 12B may be separated by an angle that varies between 0° when the lid is closed to 90°, 140°, or more when the lid is fully opened.

As shown in FIG. 1, device 10 may have input-output devices such as track pad 18 and keyboard 16. Track pad 18 may be formed from a touch sensor that gathers touch input from a user's fingers. Keyboard 16 may have an array of keys 16K that protrude through openings in the upper wall of housing 12B.

Display 14 may serve as a primary display for device 10 and may sometimes be referred to as a main display. Device 10 may also have one or more additional displays such as ancillary display 20. In the example of FIG. 1, ancillary display 20 has an elongated shape (e.g., a long thin rectangular shape) that allows ancillary display 20 to be mounted to base housing 12B adjacent to the uppermost row of keyboard keys 16K in keyboard 16. In this location, ancillary display 20 lies between the upper edge of keyboard 16 and the lower edge of main display 14 and is therefore adjacent to both keyboard 16 and main display 14. There is a single ancillary display 20 in the illustrative configuration for device 10 that is shown in FIG. 1. Additional ancillary displays may be included in device 10, if desired.

Display 14 and/or display 20 may be a liquid crystal display (LCD), a plasma display, an organic light-emitting diode (OLED) display, an electrophoretic display, or a display implemented using other display technologies. A touch sensor may be incorporated into displays 14 and/or 20 (i.e., display 14 may be a touch screen display and/or display 20 may be a touch screen display). With one illustrative configuration, which may sometimes be described herein as an example, main display 14 may be liquid crystal display or organic light-emitting diode display that is insensitive to touch and ancillary display 20 may be an elongated touch sensitive display such as a touch sensitive organic light-emitting diode display (e.g., a display that includes a two dimensional touch sensor that overlaps an array of pixels in display 20). Other configurations may be used, if desired.

Touch sensors for a touch sensitive display such as ancillary display 20 may be resistive touch sensors, capacitive touch sensors, acoustic touch sensors, light-based touch sensors, force sensors, or touch sensors implemented using other touch technologies. With one illustrative configuration, ancillary display 20 may include an array of capacitive touch sensor electrodes that form a capacitive touch sensor for display 20.

If desired, device 10 may also have components such as a camera, microphones, speakers, buttons, status indicator lights, sensors, and other input-output devices. These devices may be used to gather input for device 10 and may be used to supply a user of device 10 with output. Ports in device 10 may receive mating connectors (e.g., an audio plug, a connector associated with a data cable such as a Universal Serial Bus cable, a data cable that handles video and audio data such as a cable that connects device 10 to a computer display, television, or other monitor, etc.).

As shown in FIG. 1, device 10 may include light sensing components such as one or more ambient light sensors 30. An ambient light sensor 30 may, for example, be mounted behind a portion of display 14 or may be mounted in base housing 12B or other parts of device 10. Ambient light sensor(s) 30 may be used in gathering information on ambient lighting conditions. For example, a monochrome ambient light sensor (or sensors) may be used in gathering ambient light intensity information. If desired, device 10 may have color ambient light sensors (e.g., light sensors that measure color and intensity). Color measurements may produce color data such as color coordinates (e.g., CIE x and y) and color temperature information (e.g., correlated color temperatures). During operation, device 10 can make adjustments to the color of content on display 14 and/or display 20 and may make adjustments to keyboard backlighting for keys 16K based on light intensity and/or color information from sensors 30 and based on user input (e.g., keypress input or other user input that raises or lowers screen brightness or that adjusts automatic keyboard backlight brightness adjustment functions, etc.).

To ensure that color and brightness adjustments made to display 20 appear aesthetically pleasing to a user, device 10 may consider the apparent color of keyboard glyphs (key symbols) on keyboard 16 and the color cast (sometimes referred to as the white point, color temperature, or color) of display 14 when making adjustments to display 20.

Figure 2:
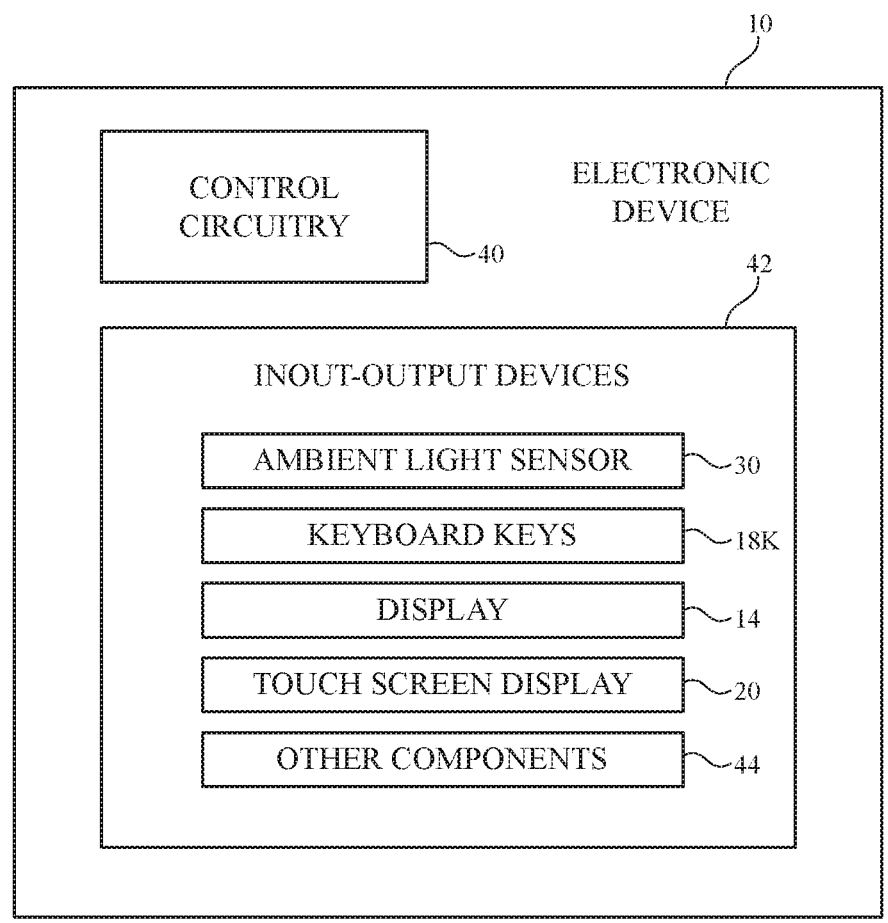
FIG. 2 is a schematic diagram of an illustrative electronic device in accordance with an embodiment.

A schematic diagram showing illustrative components that may be used in device 10 is shown in FIG. 2. As shown in FIG. 2, device 10 may include control circuitry 40. Control circuitry 40 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in circuitry 40 may be used to control the operation of device 10. This processing circuitry may be based on one or more microprocessors, microcontrollers, digital signal processors, application specific integrated circuits, etc.

Circuitry 40 may be used to run software on device 10, such as internet browsing applications, voice-over-internet-protocol (VOIP) telephone call applications, email applications, media playback applications, an operating system or other software that controls display operations associated with adjusting the color cast (white point) for displayed content, software associated with adjusting display brightness, software for controlling adjustments to keyboard backlighting brightness, etc. To support interactions with external equipment, circuitry 40 may be used in implementing communications protocols. The software (code) for implementing these functions may be stored in a non-transitory storage medium (e.g., non-volatile memory, etc.). When configured appropriately by software code, circuitry 40 can ensure that displayed content such as content displayed on ancillary display 20 will have a color cast that is aesthetically appealing in view of surrounding output being produced by device 10 (e.g., in view of the color cast of main display 14, the color of glyphs on keyboard keys 16K, etc.).

Electronic device 10 may include input-output devices 42. Input-output devices 42 may be used by a user to supply data to device 10 and/or may be used to gather data from the environment surrounding device 10. Input-output devices 42 may also be used to provide data from device 10 to external devices and/or to supply output to a user. Input-output devices 42 may include ambient light sensor(s) 30, keyboard keys 18K, displays such as main display 14 and ancillary touch screen display 20, and may include other components 44. Components 44 may include user interface devices, data port devices, and other input-output components. For example, components 44 may include touch screens, displays without touch sensor capabilities, buttons, scrolling wheels, touch pads, key pads, keyboards, microphones, cameras, buttons, speakers, status indicators, light sources, audio jacks and other audio port components, digital data port devices, light sensors, light-emitting diodes, motion sensors (accelerometers), capacitance sensors, proximity sensors, magnetic sensors, force sensors (e.g., force sensors coupled to a display to detect pressure applied to the display), wireless circuitry, etc.

Figure 3:
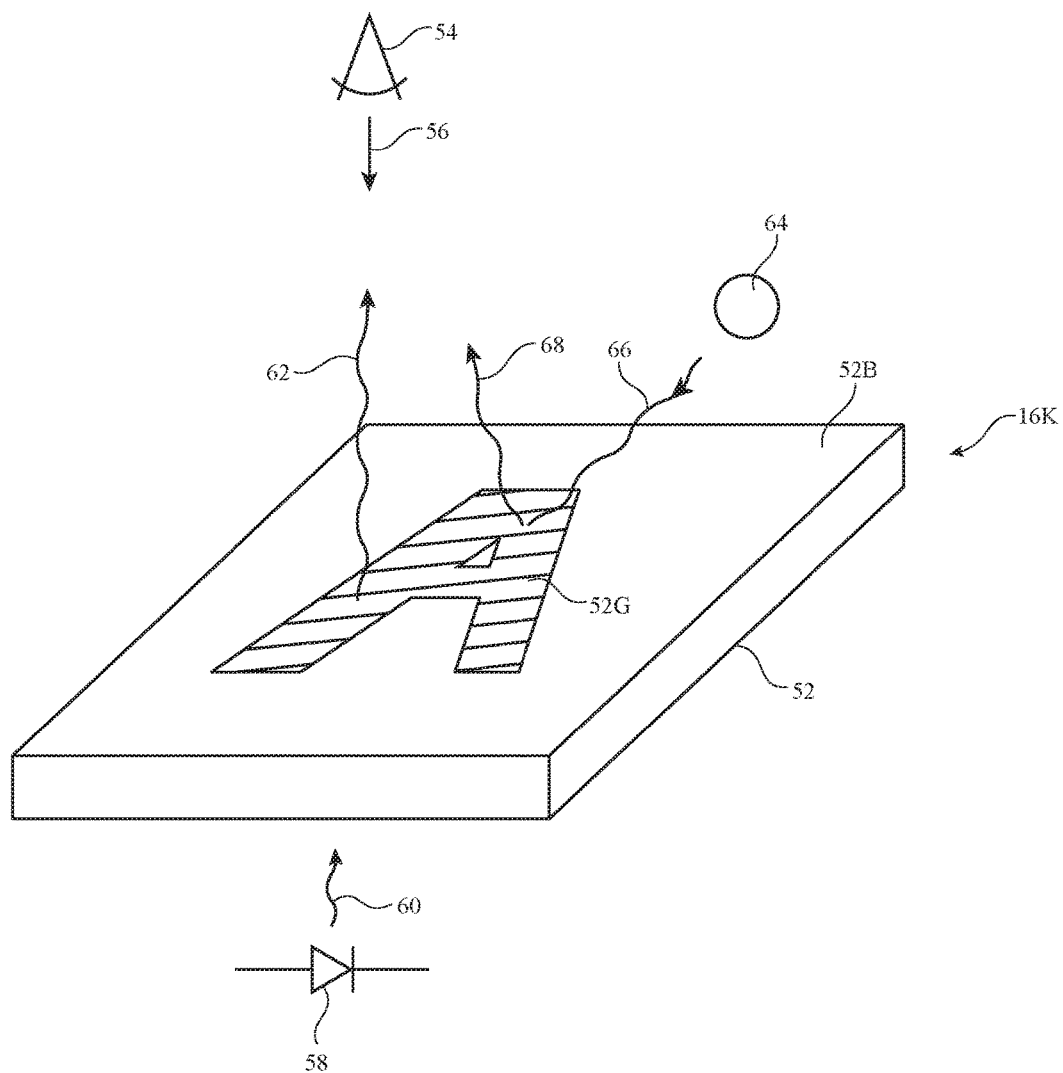
FIG. 3 is a perspective view of an illustrative keyboard key with a glyph in accordance with an embodiment.

A perspective view of an illustrative keyboard key in keyboard 16 is shown in FIG. 3. As shown in FIG. 3, keyboard key 16K may have a key member (sometimes referred to as a key cap) such as key member 52. Surface 52B of key member 52 may have a dark color (e.g., black)

or other suitable color. A glyph such as glyph 52G may be present on the face of key member 52. Glyph 52G (e.g., an alphanumeric character or other keyboard key symbol) may serve as a label for key 16K and may be formed from white ink or other material that is visible against the background presented by the dark color on surface 52. If desired, keyboard keys such as key 16K may have other configurations (e.g., configurations in which glyphs are formed by printing black labels surrounded by white backgrounds). The configuration of FIG. 3 in which surface 52B is dark (e.g., black) and in which glyph 52G has a lighter color such as white may sometimes be described herein as an example.

Keyboard key 16K may be backlit. For example, a light source such as light-emitting diode 58 (e.g., a white light-emitting diode) may emit light 60 that is blocked by surface 52B and allowed to pass through glyph 52G, which is translucent. Light transmitted through glyph 52G (e.g., transmitted light 62) may be viewed by a user such as user 54 who is viewing keyboard key 16K in direction 56.

Light-emitting diode 58 may produce backlight illumination with a relatively cold appearance. For example, light 60 and light 62 may have a correlated color temperature (CCT) of 6500K (e.g., light 60 and 62 may correspond to the CIE standard illuminant D65, which represents common daylight conditions) or light 60 and 62 may have a colder appearance (e.g., a CCT of 7500 K or 8000 K, etc.).

Ambient illumination source 64 may produce cold light (e.g., when source 64 is the sun and device 10 is being used in a shaded outdoors environment) or may produce warm light (e.g., when source 64 is a dimmer warm indoor light source). As shown in FIG. 3, some of the light viewed by user 54 when viewing keyboard key 16K in direction 56 may originate from diode 58 (e.g., light 62, which has passed through glyph 52G) and some of this light may originate from ambient light source 64 (e.g., light 66 from light source 64 may reflect from the surface of glyph 52G and may be viewed by user 54 as reflected light 68).

During operation, device 10 (e.g., control circuitry 40) may adjust the magnitude of the backlight illumination 60 produced by light-emitting diode 58. For example, automatic adjustments to light-emitting diode 58 may be made in response to ambient light sensor measurements of ambient light intensity levels (e.g., if a user has previously directed device 10 to automatically illuminate keyboard 16 in low light). Ambient light levels may also change (e.g., as a user carries device 10 between bright and dim environments and environments with different color temperatures). Because both backlight 62 and ambient light 68 affect the appearance of glyph 52G to user 54, there is a potential for the appearance of glyph 52G (e.g., the color temperature of glyph 52G) to vary significantly during use of device 10.

Consider, as an example, a scenario in which device 10 is being used outdoors in bright cold light. In this situation, light 68 will be dominant and glyph 52G will appear to have a cold white appearance (e.g., D65), regardless of the state of light-emitting diode 58. As another example, consider a scenario in which device 10 is being used indoors in dim warm light. In this situation, reflected ambient light 68 may have a warm color. If light-emitting diode 58 is off, the appearance of glyph 52G will be determined by the warm reflected ambient light and will be warm. If light-emitting diode 58 is on, transmitted backlight illumination 62 will be brighter than warm reflected ambient light 68. As a result, the backlight illumination will dominate the reflected ambient light and the appearance of glyph 52G will be cold (e.g., D65 in situations in which light 60 has a CCT value of about 6500 K).

The color temperature of main display 14 (sometime referred to as the white point or color cast of display 14) may be fixed or may vary. In fixed scenarios, the color temperature of display 14 does not change after being calibrated in a factory during manufacturing. For example, the white point of display 14 may be set to D65 or other suitable white point value. In varying scenarios, the white point of display 14 may be adjusted in real time based on measured ambient light color (e.g., to warm display 14 in warm ambient light environments and to cool display 14 in cold ambient light environments). The color cast of content on main display 14 may also be adjusted as a function of time of day (e.g., to warm the content of display 14 at night so as to avoid emitting too much blue light at night, which could affect a user's sleep).

The color cast of content displayed on ancillary display 20 may also be varied. For example, the some or all of the content on display 20 may be displayed with a color that is matched to the color of display 20 and/or some or all of the content on display 20 may be displayed with a color that is matched to keyboard glyphs 52G.

In some scenarios, the content on display 20 may be categorized as being similar to a keyboard glyph. For example, display 20 may display selectable media playback control symbols. These symbols may sometimes be referred to as reconfigurable glyphs, because control circuitry 40 can adjust the shape and size of the symbols on display 20 dynamically (e.g., to accommodate different user input schemes for different software applications, etc.). Because display 20 is touch sensitive (in the present example), a user may select a desired media playback function by pressing a finger against a corresponding selectable media playback control symbol.

The displayed reconfigurable glyphs may be white symbols presented on a black background. In these situations, the reconfigurable glyphs are white, have symbol shapes of the same type as glyphs 52G in keyboard 16, and are being pressed by a user in the same way that a user may press a desired keyboard key 16K to make a selection. Because the reconfigurable glyphs share at least these attributes with keyboard glyphs 52G, a user will generally expect that the reconfigurable glyphs will have a whitish appearance with the same color cast as glyphs 52G. For example, if ambient lighting conditions are bright and reflected light 68 has a color temperature of 6500 K, user 54 will expect adjacent glyphs in display 20 to have a white point of D65. Content on display 20 that has the appearance of a glyph (e.g., symbols for key-like function controls, etc.) may sometimes be referred to herein as "input display contents."

The user's expectations of color matching may also extend to non-glyph content on display 20. Non-glyph content (which may sometimes be referred to as "output display contents") may include images (e.g., multiple small photograph thumbnail icons over which a user may slide a finger back or forth to move back or forth through a photo album, color gradients and grayscale gradients in color picker touch screen options, etc.). Output display content is more similar to the rich static and moving image content that is displayed on main display 14 than to glyphs 52G on keyboard 16, so a user will generally expect that output display content will match appearance of the content on display 14. In particular, a user will expect that an image or other output display content on display 20 will have the same color temperature (color cast) as the color temperature of display 14. If, as an example, main display 14 has a color temperature of 6500 K, image-based selectable options and other output display content on display 20 will be expected to have a similar color temperature (e.g., 6500 K).

These expectations can be met adjusting the color cast of content on display 20 to match the current color cast of display 14 and/or the current color cast of glyphs 52G as appropriate. Illustrative examples showing how the color cast of content being displayed on display 20 can be adjusted in this way are shown in FIGS. 4, 5, 6, and 7.

Figure 4:
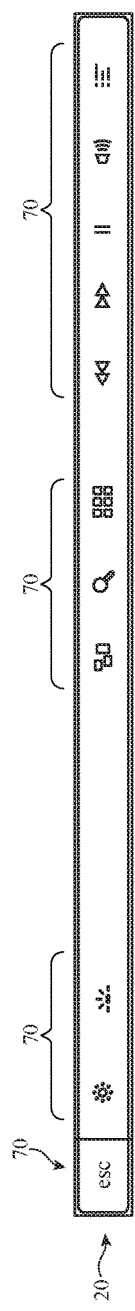
FIGS. 4, 5, 6, and 7 are diagrams of an illustrative ancillary display with different types of content in accordance with an embodiment.

In the example of FIG. 4, the content on display 20 includes input display content 70 such as an "ESC" symbol (glyph), and glyphs that serve as labels for media playback options and other options. The symbols of input display content 70 may include, for example, a fast forward symbol, fast reverse symbol, a forward symbol, a reverse symbol, a pause symbol, a stop symbol, a volume symbol, a mute symbol, a search option symbol, alphanumeric text symbols, function key symbols (e.g., F1, F2, F3 . . . ), special character symbols, and other reconfigurable glyphs. The color cast of input display content 70 of display 20 of FIG. 4 may be matched to the color cast of glyphs 52G to meet a user's expectation that these similar items will have similar appearances.

Figure 5:
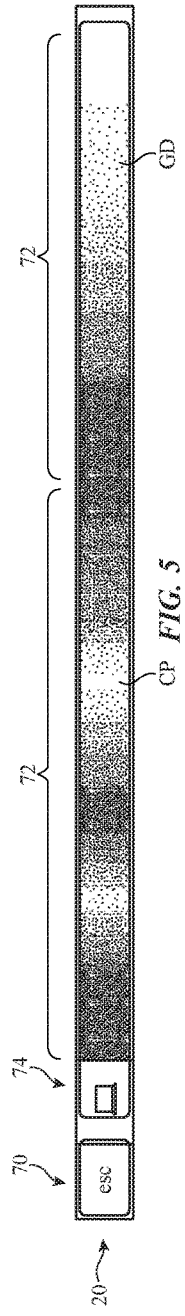

In the example of FIG. 5, the content on display 20 includes output display content 72 such as a color picker option CP (e.g., a continuous gradient of different colors that a user can use to select a desired color when using an image editing program) and an associated selectable option GD with a monochrome gradient. Output display content 72 may be displayed with a color that matches that of display 14 to meet a user's expectation that rich colorful content of this type (whether as part of a selectable option on display 20 or as part of a non-selectable content on display 14) will have similar appearances. The illustrative reconfigurable glyph of FIG. 5 (e.g., the "ESC" option") is a type of input display content 70 and may therefore be displayed with a color temperature that matches the current color temperature of glyphs 52G. Icon 74 may have a bright color and may be used in controlling the same application that is controlled by output display content 72, so icon 74 may be displayed with a color cast matching that of display 14 (as an example).

Figure 6:
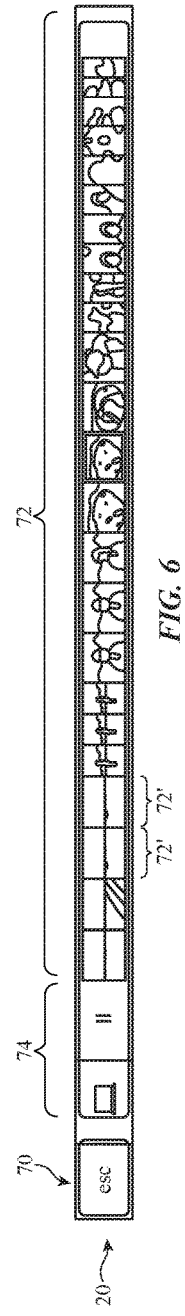

FIG. 6 shows how the content on display 20 may include output display content 72 such as an option with numerous small images 72' (e.g., thumbnails corresponding to actual full-size images in a photo album). The user may slide a finger back and forth over content 72 to navigate back and forth through photo album images (as an example). Because output display content 72 of FIG. 6 includes images 72', output display content 72 may be displayed with a color that matches that of display 14 to meet a user's expectation that image-based content (whether as part of a selectable option on display 20 or as part of a non-selectable content on display 14) will appear similarly. The illustrative reconfigurable glyph of FIG. 6 (e.g., the "ESC" option") is a type of input display content 70 and may therefore be displayed with a color temperature that matches the current color temperature of glyphs 52G. Icon 74 be a brightly colored and textured symbol that is used in controlling the same application that is controlled by output display content 72, so icon 74 may be displayed with a color cast matching that of display 14 (as an example).

Figure 7:
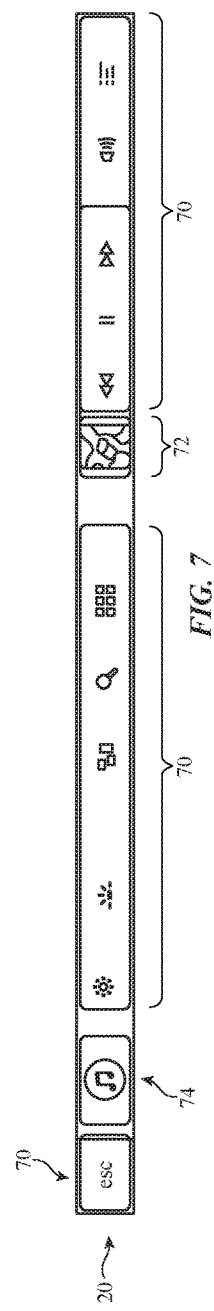

The example of FIG. 7 shows how display 20 may include input display content 70 (e.g., an ESC symbol or other reconfigurable glyph, media controls, other selectable icons, etc.) and output display content 72 (e.g., an image). Icon 74 may be displayed with colorful content with the expectation of using colors matching those displayed on display 14 and may therefore be appropriate for matching to the color temperature of display 14.

The amount of color matching that is used when matching the white point of content on display 20 to that of display 14 or glyphs 52G may be selected by a user or may be defined in a default setting. As an example, color may be said to be color matched (white point matched, color cast matched, matched in correlated color temperature, etc.) when their CIE x values are within 0.0035 of each other, are within 0.01 of each other, are within between 0.0001 and 0.1 of each other, are within less than 0.1 of each other, or have any other suitable amount of matching and when their CIE y values are within 0.004 of each other, are within 0.01 of each other, are within between 0.0001 and 0.1 of each other, are within less than 0.1 of each other, or have any other suitable amount of matching.

Figure 8:
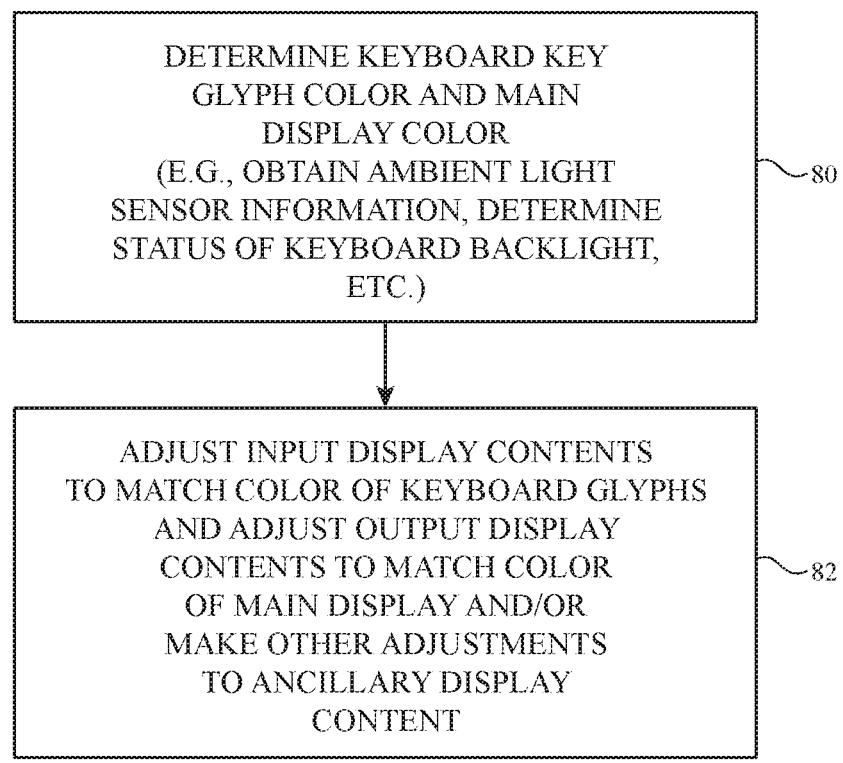
FIG. 8 is a flow chart of illustrative operations involved in adjusting ancillary display content in accordance with an embodiment.

Illustrative operations involved in adjusting the color cast of content on display 20 during operation of device 10 are shown in FIG. 8.

At step 80, device 10 may determine the color casts of glyphs 52G and main display 14. With one illustrative approach, the color cast of glyphs 52G may be determined by evaluating the state of backlight light-emitting diodes 58 and the current ambient light level (intensity) obtained using an ambient light sensor 30. If diodes 58 are on, light 60 may have a cold temperature (e.g., D65) and it can be assumed that the appearance of glyphs 52G will be cold (e.g., D65). If diodes 58 are off and if ambient light levels are low, it can be assumed that the appearance of glyphs 52G will be warm (e.g., 4400 K, less than 5000 K, or other warm color cast). With another illustrative approach, the color cast of glyphs 52G may be determined using information on the status of backlight light-emitting diodes 58 and color and intensity ambient light sensor measurements from a color ambient light sensor. In this situation, it can be assumed that glyphs 52G will be at D65 when the keyboard backlight is on. When the keyboard backlight is off, the color of glyphs 52G may be assumed to match the measured color from the color ambient light sensor.

The color cast (white point) of display 14 may be fixed or may be dynamically adjusted (e.g., if a color cast is being applied based on time of day and/or if device 10 is configured to adjust the white point of display 14 based on ambient light color measurements). The current white point (color cast) of display 14 in either situation is known to control circuitry 40.

At step 82, after determining the color cast of display 14 and the color cast of glyphs 52G, control circuitry 40 can analyze the content to be displayed on display 20 to determine whether that content is input display content 70 (e.g., reconfigurable glyphs) or is output display content 72 (e.g., options with tiles of thumbnail images, color picker gradients, etc.). Control circuitry 40 can then display the input display content with a color cast that matches the color cast of glyphs 52 and can display the output display content with a color cast that matches the color cast of main display 14.

If desired, processing resources can be conserved by using the ambient light sensor measurements of step 80 to determine whether device 10 is indoors (e.g., the measured ambient light level is less than 550 lux) or outdoors (e.g., the measured ambient light level is more than 550 lux). In response to determining that device 10 is outdoors (in this scenario), both input and output display content in display 20 may be displayed with a cold color temperature (e.g., D65). In response to determining that device 10 is indoors, both input and output display content may be displayed with a warm color cast (e.g., 4400 K, less than 5000 K, or other suitable warm color cast). Glyphs 52G will tend to appear yellowish indoors, so displaying the content on display 20 with a warm color cast will avoid potential mismatch between the glyphs of display 20 and the glyphs of keyboard 16.

Other operating modes may be used in controlling the color temperature of all or a portion of display 20 in coordination with the color of glyphs 52G and display 14. The foregoing examples are merely illustrative.

The foregoing is merely illustrative and various modifications can be made to the described embodiments. The foregoing embodiments may be implemented individually or in any combination.

What is claimed is:

1. An electronic device, comprising:
a first display with a first color cast;
a keyboard having keyboard keys with glyphs with a second color cast that is warmer or cooler than the first color cast; and
a second display having a third color cast; and
control circuitry configured to:
automatically adjust the third color cast to match the first color cast and display first content on the second display during a first time period; and
automatically adjust the third color cast to match the second color cast and display second content on the second display during a second time period that is at least partially different from the first time period.

2. The electronic device defined in claim 1 wherein the electronic device comprises a base housing and a display housing that are coupled by a hinge and wherein the first display is mounted in the display housing.

3. The electronic device defined in claim 2 wherein the keyboard is in the base housing and the second display is in the base housing.

4. The electronic device defined in claim 3 wherein the second display is adjacent to the keyboard and the first display and includes a touch sensor.

5. The electronic device defined in claim 4 wherein the second content comprises glyphs.

6. The electronic device defined in claim 5 wherein the glyphs comprise media control icons.

7. The electronic device defined in claim 4 wherein the first content comprises a selectable option containing at least one image.

8. The electronic device defined in claim 4 wherein the first content comprises a color picker option having a color gradient.

9. A laptop computer, comprising:
a display housing;
a first display mounted in the display housing;
a base housing that is rotatably coupled to the display housing;
an ambient light sensor in the base housing that measures an ambient light level;
a keyboard in the base housing having a plurality of keyboard keys with keyboard glyphs, wherein the keyboard glyphs are characterized by a color cast and wherein the keyboard glyphs are illuminated by a keyboard backlight to a keyboard illumination level;
a second display adjacent to the keyboard, wherein content is displayed on the second display having an associated color cast that is warmer or cooler than the color cast of the keyboard glyphs; and
control circuitry configured to:
dynamically determine the color cast of the keyboard glyphs based on the ambient light level and the keyboard illumination level; and
automatically adjust the color cast of the content displayed on the second display to match the determined color cast of the keyboard glyphs.

10. The laptop computer defined in claim 9 wherein the keyboard backlight comprises light-emitting diodes and wherein the control circuitry is configured to dynamically determine the color cast of the keyboard glyphs at least partly by determining whether the light-emitting diodes are on.

11. The laptop computer defined in claim 9 wherein the ambient light sensor is a color ambient light sensor, wherein the control circuitry is configured to dynamically determine the color cast of the keyboard glyphs based at least partly on color ambient light information from the color ambient light sensor.

12. The laptop computer defined in claim 9 wherein the first display has an associated white point and wherein the control circuitry is further configured to display content on the second display with a color cast that matches the white point.

13. The laptop computer defined in claim 12 wherein the white point corresponds to a color temperature of at least 6500 K.

14. The laptop computer defined in claim 13 wherein the content on the second display with the color cast that matches the white point includes at least one image.

15. The laptop computer defined in claim 9 wherein the content is displayed on the second display has a color temperature of less than 5000 K.

16. The laptop computer defined in claim 15 wherein the content includes at least glyph.

17. The laptop computer defined in claim 16 wherein the glyph includes at least one media control icon.

18. An electronic device, comprising:
a first display on which first content is displayed with a first color cast;
at least one key having a glyph with a second color cast that is warmer or cooler than the first color cast;
a second display on which second content is displayed with third color cast and on which third content is displayed with a fourth color cast;
an ambient light sensor that measures an ambient light level; and
control circuitry configured to:
automatically adjust the third color cast to match the second color cast and the fourth color cast to match the first color cast when the ambient light level is at a first level; and
automatically adjust the third color cast to be warmer than the first color cast in response to determining that the ambient light level is at a second level that is less than the first level.

19. The electronic device defined in claim 18 wherein the second content includes reconfigurable glyphs and wherein the third content comprises at least one image.

* * * * *